(12) United States Patent
Sakurai

(10) Patent No.: US 11,927,770 B2
(45) Date of Patent: Mar. 12, 2024

(54) VARIABLE WAVELENGTH FILTER

(71) Applicant: santec Holdings Corporation, Aichi (JP)

(72) Inventor: Yasuki Sakurai, Aichi (JP)

(73) Assignee: santec Holdings Corporation, Aichi (JP)

( * ) Notice: Subject to any disclaimer, the term of this patent is extended or adjusted under 35 U.S.C. 154(b) by 483 days.

(21) Appl. No.: 17/147,020

(22) Filed: Jan. 12, 2021

(65) Prior Publication Data

US 2022/0099991 A1 Mar. 31, 2022

(30) Foreign Application Priority Data

Sep. 30, 2020 (JP) .................. 2020-166049

(51) Int. Cl.
 *G02B 27/42* (2006.01)
 *G02B 26/08* (2006.01)

(52) U.S. Cl.
 CPC ..... *G02B 27/4244* (2013.01); *G02B 26/0833* (2013.01)

(58) Field of Classification Search
 CPC ............ G02B 27/4244; G02B 26/0833; G02B 26/105; G02B 6/29395; G02B 6/3512; G02B 6/3556; G02B 6/356; G02B 6/3598; G02B 6/2931; G02B 5/203; G01J 3/0205; G01J 3/027; G01J 3/0291; G01J 3/021; G01J 3/0294; G01J 3/18; G01J 3/32; G01J 3/0208; G01J 3/0218; G01J 2003/062; G01J 2003/064
 USPC .................. 359/223; 356/328, 300
 See application file for complete search history.

(56) References Cited

U.S. PATENT DOCUMENTS

| | | | | |
|---|---|---|---|---|
| 7,382,809 B2* | 6/2008 | Chong | ................. | H01S 3/1055 |
| | | | | 372/100 |
| 7,408,639 B1* | 8/2008 | Strasser | ............... | G02B 6/2706 |
| | | | | 385/17 |
| 2008/0085119 A1 | 4/2008 | Ye et al. | | |

(Continued)

FOREIGN PATENT DOCUMENTS

| | | |
|---|---|---|
| CN | 104931138 A | 9/2015 |
| CN | 108828766 A | 11/2018 |

(Continued)

OTHER PUBLICATIONS

Notification of Reasons for Refusal issued in Japanese Patent Application No. 2020-166049, dated Nov. 10, 2020 (10 pages).

*Primary Examiner* — Stephone B Allen
*Assistant Examiner* — Jyotsna V Dabbi
(74) *Attorney, Agent, or Firm* — Osha Bergman Watanabe & Burton LLP

(57) ABSTRACT

A tunable filter includes: an optical input/output unit; a first mirror having a first reflective surface disposed to reflect input light from the optical input/output unit; a transmissive diffraction grating disposed on a propagation path of the input light reflected by the first mirror; and a second mirror having a second reflective surface disposed to reflect transmitted diffracted light from the transmissive diffraction grating corresponding to the input light. The first reflective surface is a variable-angle reflective surface. The second reflective surface has a fixed orientation relative to the transmissive diffraction grating.

10 Claims, 7 Drawing Sheets

(56) References Cited

U.S. PATENT DOCUMENTS

| | | | | |
|---|---|---|---|---|
| 2008/0212338 A1* | 9/2008 | Kohara | ............... | G02B 6/0053 |
| | | | | 359/627 |
| 2009/0303562 A1* | 12/2009 | Koeppen | ................... | G01J 3/14 |
| | | | | 359/213.1 |
| 2012/0224181 A1 | 9/2012 | Lu | | |
| 2016/0165324 A1* | 6/2016 | Zhao | ................... | G02B 6/2938 |
| | | | | 398/48 |

FOREIGN PATENT DOCUMENTS

| | | |
|---|---|---|
| CN | 209928136 U | 1/2020 |
| JP | 2008-203508 A | 9/2008 |
| JP | 2010-520491 A | 6/2010 |
| JP | 2018-155933 A | 10/2018 |
| WO | 2018/101281 A1 | 6/2018 |

* cited by examiner

|  | $\lambda_c$(nm) | 1527 | 1549 | 1570 |
|---|---|---|---|---|
|  | $\theta$ | 42.96 | 45.24 | 47.44 |
| Compensating prism absent | cos α/W | 1.045 | 1 | 0.955 |
|  | 3dB BW(GHz) | 156.75 | 150 | 143.25 |
| Compensating prism present | cos α/W | 0.998 | 1 | 0.997 |
|  | 3dB BW(GHz) | 149.7 | 150 | 149.55 |

FIG. 6

VARIABLE WAVELENGTH FILTER

FIELD OF ART

The present disclosure relates to a tunable filter.

BACKGROUND

Conventionally, optical communication networks are known that use wavelength-division multiplexing (WDM) optical communication art. Optical communication networks have an optical amplifier disposed therein to compensate for transmission loss in optical fibers. As the optical amplifier, for example, an erbium-doped fiber amplifier (EDFA) is used.

In the optical amplifier, when amplifying an optical signal, ASE (amplified spontaneous emission) noise is added to the optical signal. The ASE noise restricts a transmission distance of the optical signal. As such, optical communication networks have disposed therein a tunable filter for removing the ASE noise.

A known tunable filter is provided with a diffraction grating (for example, see patent literature 1). This tunable filter uses a mirror to reflect light diffracted in different directions according to wavelength by the diffraction grating so among input light, light of a defined wavelength band is selectively output through output optical fibers. The mirror is configured so an angle of a reflective surface can be changed. Angle adjustment of the reflective surface changes the wavelength band coupled to the output optical fibers.

PATENT LITERATURE

[Patent Literature 1] US 2008/0085119 A1

Incidentally, important performance indicators of the tunable filter include vibration and impact resistance. For stable operation of the optical communication network, it is sought of the tunable filter to stably maintain the wavelength and an intensity of the output light even when exposed to vibrations and impacts.

In the tunable filter, generally, a MEMS mirror is used for angle adjustment of the reflective surface, and the vibration and impact resistance of the tunable filter is strongly related to a resonance frequency of the MEMS mirror.

When vibrations and impacts of a frequency near the resonance frequency arise in the MEMS mirror, a deflection angle of the MEMS mirror becomes extremely large, and the output of the tunable filter is more likely to become unstable. As such, the MEMS mirror is, for example, designed to be small so as to have a high resonance frequency, thereby being designed to have high resistance against low-frequency vibrations and impacts in particular.

However, an optical full width at half maximum of the tunable filter depends on a beam diameter of the light incident on the diffraction grating. That is, to configure the tunable filter as a narrow-linewidth filter of a narrow full width at half maximum, the beam diameter of the light incident on the diffraction grating must be large.

Therefore, in the conventional tunable filter, which disposes the MEMS mirror after the diffraction grating, the MEMS mirror needs to be designed to be large so as to narrow the linewidth. That is, the MEMS mirror needs to be made large so it can receive diffracted light of a large beam diameter.

In this manner, in the configuration of the conventional tunable filter, there is a trade-off between increasing the vibration and impact resistance and narrowing the filter linewidth. This trade-off can arise even when a variable-angle mirror other than the MEMS mirror is used.

SUMMARY

Therefore, one or more embodiments of the present invention provide a novel tunable filter than can provide both increased vibration and impact resistance and a narrow filter linewidth.

A tunable filter according to one or more embodiments is provided with an optical input/output unit, a first mirror, a transmissive diffraction grating, and a second mirror. The first mirror has a first reflective surface disposed to reflect input light from the optical input/output unit. The transmissive diffraction grating is disposed on a propagation path of the input light reflected by the first mirror. The second mirror has a second reflective surface disposed to reflect transmitted diffracted light from the transmissive diffraction grating corresponding to the input light.

According to one or more embodiments, the first mirror has a variable-angle reflective surface as the first reflective surface above. The second mirror has a reflective surface having a fixed orientation relative to the transmissive diffraction grating as the second reflective surface above.

In this tunable filter, due to an incidence angle relative to the transmissive diffraction grating of the input light reflected by the first mirror changing according to the angle of the first reflective surface, at the second reflective surface, among the transmitted diffracted light, light of a defined wavelength band corresponding to the angle of the first reflective surface is reflected so as to be propagated down a regular path. The light of the defined wavelength band reflected at the second reflective surface is propagated on a path heading toward the optical input/output unit as the regular path and output from the optical input/output unit.

According to a configuration of the tunable filter that disposes the first mirror as a variable-angle mirror on a propagation path of the light between the optical input/output unit and the transmissive diffraction grating, a beam diameter of the incident light on the transmissive diffraction grating can be enlarged as necessary downstream, in the light propagation direction, from the variable-angle mirror.

Therefore, according to one or more embodiments, the tunable filter can be configured to input light of a beam diameter that realizes a desired full width at half maximum to the transmissive diffraction grating while reducing a size of the variable-angle mirror for increased vibration and impact resistance. That is, according to the tunable filter according to one or more embodiments, both increased vibration and impact resistance and a narrow filter linewidth can be provided.

According to one or more embodiments, the tunable filter can be configured so the light of the defined wavelength band reflected at the second reflective surface is propagated down a return path, which is from the second reflective surface to the optical input/output unit via the transmissive diffraction grating and the first mirror and corresponds to an outward path of the light of the defined wavelength band included in the input light from the optical input/output unit to the second reflective surface.

According to one or more embodiments, the tunable filter may be further provided with no less than one optical component for enlarging the beam diameter of the light incident on the transmissive diffraction grating. According to one or more embodiments, the tunable filter can be provided with at least one optical component disposed between the first mirror and the transmissive diffraction grating to enlarge the beam diameter of the input light propagated from the first mirror to the transmissive diffraction grating.

According to one or more embodiments, the tunable filter may be provided with an optical element for suppressing wavelength dependency of the full width at half maximum of the tunable filter. According to one or more embodiments, the optical element may be disposed between the first mirror and the transmissive diffraction grating. According to one or more embodiments, the above optical element may be configured to, for light of each wavelength band to be filtered corresponding to the input light, reduce differences between inverses, of an incidence-direction beam width of a projection surface of the light of each wavelength band projected onto the transmissive diffraction grating, at each wavelength band.

The full width at half maximum of each wavelength is dependent on the inverse of the incidence-direction beam width at the projection surface of when the light having the corresponding wavelength is projected onto the transmissive diffraction grating. Therefore, reducing the above differences enables wavelength dependency of a filter bandwidth to be suppressed. According to one or more embodiments, the above optical element can be constituted by no less than one prism designed and disposed to reduce the differences between the above inverses at each wavelength band.

According to one or more embodiments, the transmissive diffraction grating may be constituted by a substantially polarization-independent diffraction grating. According to one or more embodiments, the tunable filter may be provided with a half-wave plate. The half-wave plate can be disposed between the transmissive diffraction grating and the second mirror, in a state of having an optical axis tilted 45 degrees relative to a grating axis of the transmissive diffraction grating.

By disposing the half-wave plate, a polarization state of the light incident on the transmissive diffraction grating on the return path exhibits an orthogonal relationship to a polarization state of the light on the outward path. As such, even when the transmissive diffraction grating has polarization dependency, polarization dependency of the light that passes through the transmissive diffraction grating and is output from the optical input/output unit on the return path can be reduced.

According to one or more embodiments, the first mirror may be a MEMS mirror. According to one or more embodiments, a tunable filter can be provided that can realize a narrow filter linewidth even if the MEMS mirror is reduced in size.

According to one or more embodiments, the tunable filter can be designed so an incidence angle $\alpha$ of light of a wavelength $\lambda$ incident on the transmissive diffraction grating satisfies the relational expression $2 \sin \alpha \neq Nm\lambda$, which includes an inverse N of a diffraction-grating period and a diffraction order m, for an entirety of a wavelength range $\lambda_1 \leq \lambda \leq \lambda_2$, from a shortest wavelength $\lambda = \lambda_1$ to a longest wavelength $\lambda = \lambda_2$, of the light that, as the input light, becomes incident on the transmissive diffraction grating from the optical input/output unit via the first mirror.

If light of a wavelength band that satisfies $2 \sin \alpha = Nm\lambda$ were input to the tunable filter, there would be a possibility of reflected diffracted light at the transmissive diffraction grating being propagated so as to go back up the propagation path of the input light from the optical input/output unit to incidence on the transmissive diffraction grating via the first mirror and affecting an optical-transmission component positioned upstream of the tunable filter.

According to one or more embodiments, designing the tunable filter so the above relational expression is satisfied can suppress an effect of the reflected diffracted light going back up the propagation path of the input light.

BRIEF DESCRIPTION OF THE DRAWINGS

FIG. 6 A table for describing the wavelength dependency of the bandwidth, which is reduced by the bandwidth-compensating prism.

DETAILED DESCRIPTION

Embodiments of Invention

One or more illustrative embodiments of the present disclosure are described below with reference to the drawings.

Figure 1:
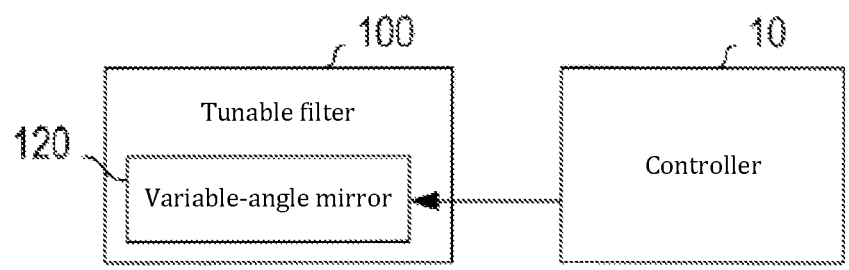
FIG. 1 A block diagram for describing that a variable-angle mirror in a tunable filter is controlled by a controller.

The tunable filter 100 of one or more embodiments illustrated in FIG. 1 is configured to be able to change a center wavelength $\lambda_C$ of a passband and is controlled by a controller 10. The tunable filter 100 and the controller 10 are built into an optical communication device.

Figure 2:
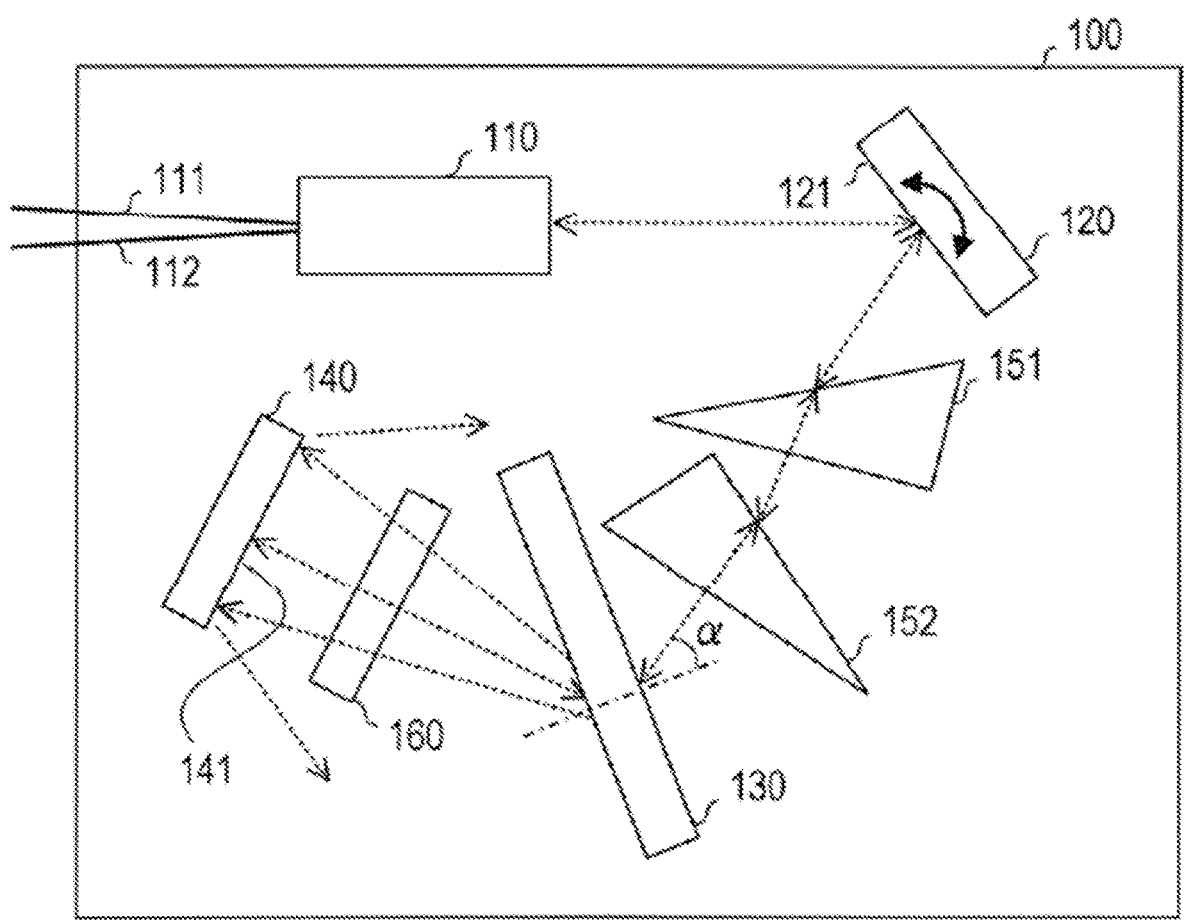
FIG. 2 A diagram for describing an optical configuration of the tunable filter.

As illustrated in FIG. 2, the tunable filter 100 is provided with a fiber collimator 110 serving as the optical input/output unit, a variable-angle mirror 120, a transmissive diffraction grating 130, and a fixed-angle mirror 140. Optionally, the tunable filter 100 can be further provided with beam-diameter-adjusting prisms 151, 152. Optionally, the tunable filter 100 can be further provided with a half-wave plate 160.

The fiber collimator 110 is configured to optically couple input optical fibers 111 and output optical fibers 112 and input upstream light transmitted through the input optical fibers 111 into an internal space of the tunable filter 100.

The fiber collimator 110 collimates and outputs the input light from the input optical fibers 111. The collimated input light output from the fiber collimator 110 is propagated to the variable-angle mirror 120.

In the internal space of the tunable filter 100, this input light is filtered, and light of a defined wavelength band corresponding to an orientation of a reflective surface 121 of the variable-angle mirror 120 returns to a fiber-collimator 110 side. This light of the defined wavelength band is output as the output light to outside the tunable filter 100 through the output optical fibers 112.

The controller 10 adjusts the center wavelength $\lambda_C$ of the passband of the tunable filter 100 by adjusting an angle of the reflective surface 121 of the variable-angle mirror 120. By being controlled by the controller 10, the tunable filter 100 is configured as a narrowband band-pass filter of a variable passband.

The variable-angle mirror 120 is constituted by a MEMS (microelectromechanical system) mirror and is configured so the angle of the reflective surface 121 thereof changes according to an applied voltage from the controller 10.

The input light reflected by the variable-angle reflective surface 121 of the variable-angle mirror 120 is propagated toward the transmissive diffraction grating 130. The input light becomes incident on the transmissive diffraction grating 130 at an incidence angle α corresponding to the angle of the reflective surface 121 of the variable-angle mirror 120. The incidence angle α is an angle of the incident light relative to a normal direction of the transmissive diffraction grating 130.

Before the input light becomes incident on the transmissive diffraction grating 130, a beam diameter of the input light is adjusted by the beam-diameter-adjusting prisms 151, 152, which are optionally provided between the variable-angle mirror 120 and the transmissive diffraction grating 130.

The beam-diameter-adjusting prisms 151, 152 adjust the beam diameter of the input light in an enlarging direction. To narrow an optical full width at half maximum of the tunable filter 100—that is, to narrow a linewidth of the output of the tunable filter 100—the input light can be adjusted to spread in a direction perpendicular to a grating direction of the transmissive diffraction grating 130.

The input light from the variable-angle mirror 120 that becomes incident on the transmissive diffraction grating 130 is diffracted by the transmissive diffraction grating 130 to a diffraction angle β corresponding to the incidence angle α and a wavelength λ and is propagated toward the fixed-angle mirror 140 as diffracted light.

A relationship between the incidence angle α, which is an angle of the incident light relative to a normal line of the transmissive diffraction grating 130; the diffraction angle β, which is an angle of the diffracted light relative to the normal line of the transmissive diffraction grating 130; and the wavelength λ of the incident light conforms to the following grating equation.

$$\sin \alpha + \sin \beta = Nm\lambda$$

Here, N is an inverse of a diffraction-grating period d, and m is a diffraction order.

According to one or more embodiments, the incidence angle α relative to the transmissive diffraction grating 130 is adjusted so first-positive-order transmitted diffracted light of the light of the defined wavelength band corresponding to the passband included in the input light becomes incident on a reflective surface 141 of the fixed-angle mirror 140 in a defined orientation.

The defined orientation is an orientation wherein the incident light is reflected by the reflective surface 141 of the fixed-angle mirror 140 so the incident light is propagated down a regular path optically coupled to the output optical fibers 112 through the fiber collimator 110.

When a diffraction angle of the first-positive-order transmitted diffracted light that becomes incident on the reflective surface 141 of the fixed-angle mirror 140 in the defined orientation is $\beta_C$, to realize a narrow-linewidth filter of the wavelength $\lambda_C$—that is, a narrowband band-pass filter of the center wavelength $\lambda_C$—the controller 10 adjusts the angle of the reflective surface 121 of the variable-angle mirror 120 so the incidence angle α of the input light relative to the transmissive diffraction grating 130 satisfies the relationship $\sin \alpha = N\lambda_C - \sin \beta_C$.

The fixed-angle mirror 140 is a mirror whose reflective surface 141 has a fixed orientation relative to the transmissive diffraction grating 130. It differs from a MEMS mirror, whose reflective surface is variable. The fixed-angle mirror 140 is disposed so the reflective surface 141 reflects the diffracted light from the transmissive diffraction grating 130.

At the fixed-angle mirror 140, among the diffracted light from the transmissive diffraction grating 130, the light of the defined wavelength band corresponding to the passband is selectively reflected to be propagated down the regular path optically coupled to the output optical fibers 112 of the fiber collimator 110.

That is, by becoming incident on the reflective surface 141 of the fixed-angle mirror 140 in the defined orientation and being reflected, the light of the defined wavelength band is propagated down a return path, from the reflective surface 141 of the fixed-angle mirror 140 to the fiber collimator 110 via the transmissive diffraction grating 130 and the variable-angle mirror 120, corresponding to an outward path from the fiber collimator 110 to the reflective surface 141 of the fixed-angle mirror 140. This selectively outputs, among the diffracted light reflected by the fixed-angle mirror 140, the light of the defined wavelength band to the outside from the output optical fibers 112.

In the tunable filter 100 of one or more embodiments, the input light is filtered in this manner, and the light of the defined wavelength band corresponding to the angle of the reflective surface 121 of the variable-angle mirror 120 is output from the output optical fibers 112.

The half-wave plate 160 is optionally provided between the transmissive diffraction grating 130 and the fixed-angle mirror 140. To suppress a diffraction efficiency of the transmissive diffraction grating 130 from being affected by polarization dependency, the half-wave plate 160 can be disposed between the transmissive diffraction grating 130 and the fixed-angle mirror 140 in a state of having an optical axis tilted 45 degrees relative to a grating axis of the transmissive diffraction grating 130.

Due to the presence of this half-wave plate 160, a polarization state of the light that becomes incident on the transmissive diffraction grating 130 on the return path exhibits an orthogonal relationship to a polarization state of the light on the outward path. As such, even if the transmissive diffraction grating 130 has polarization dependency, polarization dependency of the output light output to outside the tunable filter 100 through the output optical fibers 112 can be removed. The half-wave plate 160 is disposed to act on the diffracted light on either the outward path or the return path. The outward path and the return path can be set so as to not overlap in a normal direction of the page in FIG. 2.

If the transmissive diffraction grating 130 is a diffraction grating that is substantially polarization independent, the half-wave plate 160 does not need to be disposed. However, the half-wave plate 160 may be disposed to compensate for polarization-dependent loss in the tunable filter 100 due to diffraction-efficiency polarization dependency remaining in the transmissive diffraction grating 130.

According to the tunable filter 100 of one or more embodiments described above, the variable-angle mirror 120 for wavelength selection is disposed in a position, upstream from the transmissive diffraction grating 130, where the optical beam diameter is small. Therefore, the variable-angle mirror 120 can be configured using a small MEMS mirror corresponding to the small optical beam diameter, and vibration and impact resistance of the tunable filter 100 can be increased.

That is, the variable-angle mirror 120 can be configured using a small MEMS mirror having a high resonance frequency, and this enables the tunable filter 100 to be configured so as to be able to operate stably despite low-frequency vibrations and impacts.

Furthermore, in one or more embodiments, even if the beam diameter of the light incident on the transmissive diffraction grating 130 is increased to narrow the linewidth, there is no need to also increase a size of the MEMS mirror as in the conventional system.

In one or more embodiments, because the variable-angle mirror 120 is positioned upstream from the transmissive diffraction grating 130, disposing the beam-diameter-adjusting prisms 151, 152 between the variable-angle mirror 120 and the transmissive diffraction grating 130 enables the beam diameter of the light incident on the transmissive diffraction grating 130 to be increased without increasing a size of the variable-angle mirror 120.

In this manner, according to one or more embodiments, a large-diameter beam on the transmissive diffraction grating 130, necessary for linewidth narrowing, and a small-diameter beam on the variable-angle mirror 120, necessary to use a small MEMS mirror having a high resonance frequency, can be independently realized. As such, a tunable filter 100 can be realized that excels in vibration and impact resistance and has a narrow linewidth.

Here, linewidth narrowing is further described. The optical full width at half maximum of the tunable filter 100—that is, a bandwidth BW at −3 dB—is calculated from the following formula.

$$BW \cong 1.67 \times \frac{d \times \lambda \times \cos\alpha}{a \times \pi \times W} \quad \text{[Math. 1]}$$

d is, as above, the diffraction-grating period of the transmissive diffraction grating 130; $\lambda$ is the wavelength of the light incident on the transmissive diffraction grating 130; $\alpha$ is the incidence angle of the light incident on the transmissive diffraction grating 130; a is a number of times of incidence on the diffraction grating; and W is the beam diameter ($1/e^2$) of the light incident on the transmissive diffraction grating 130.

Figure 3:
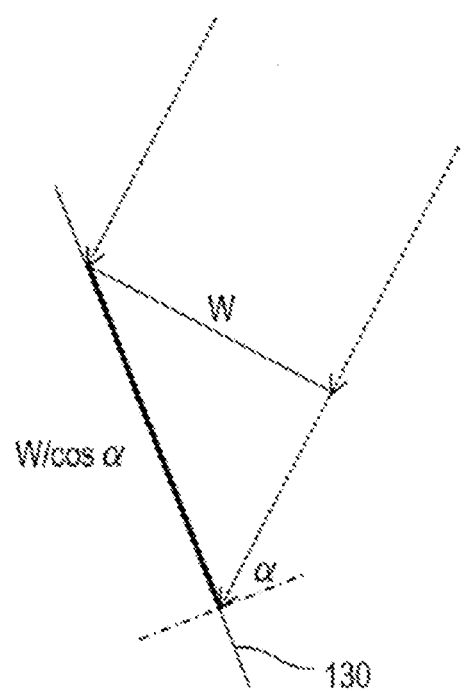
FIG. 3 An explanatory diagram relating to a beam diameter of light incident on a transmissive diffraction grating.

As understood from the above formula, the bandwidth BW is dependent on the beam diameter W—more specifically, it is proportional to an inverse of a projection beam width W/cos $\alpha$ that is an incidence-direction beam width of a projection of the light incident on the transmissive diffraction grating 130 onto the transmissive diffraction grating 130. The projection beam width W/cos $\alpha$ is illustrated in FIG. 3.

Therefore, enlarging the beam diameter W of the incident light on the transmissive diffraction grating 130 in the direction perpendicular to the grating direction of the transmissive diffraction grating 130 and increasing the incidence angle $\alpha$ enables the bandwidth BW to be narrowed and linewidth narrowing of the tunable filter 100 to be realized.

However, as above, the incidence angle $\alpha$ relative to the transmissive diffraction grating 130 must be adjusted to an angle corresponding to the center wavelength $\lambda_C$ of the passband. That is, changing the center wavelength $\lambda_C$ of the bandwidth changes the inverse of the beam width W/cos $\alpha$ and changes the bandwidth BW.

In this manner, according to the tunable filter 100 of one or more embodiments, the bandwidth BW has wavelength dependency. Therefore, to suppress the wavelength dependency of the bandwidth BW, the tunable filter 100 may be deformed (first variation).

<First Variation>

The tunable filter 100 of a first variation described below is a tunable filter wherein a majority of its configuration is identical to the tunable filter 100 of the main embodiments above. Therefore, in the following, differences between the tunable filter 100 of the first variation and the main embodiments above are selectively described, and other description is omitted as appropriate.

Figure 4:
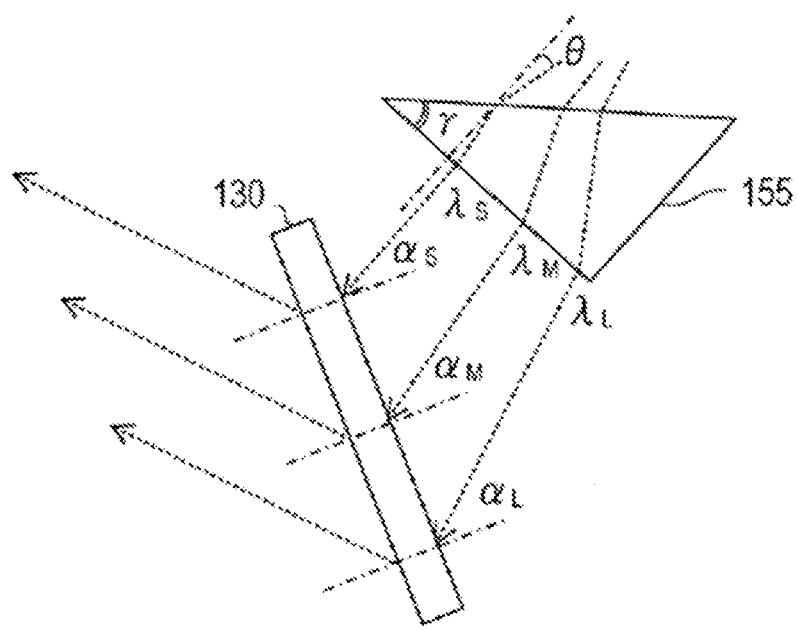
FIG. 4 An explanatory diagram relating to the tunable filter, the tunable filter being provided with a bandwidth-compensating prism.

As illustrated in FIG. 4, the tunable filter 100 of the first variation is provided with a bandwidth-compensating prism 155, for suppressing the wavelength dependency of the bandwidth BW, between the variable-angle mirror 120 and the transmissive diffraction grating 130.

The tunable filter 100 of the first variation may be provided with the bandwidth-compensating prism 155 separately from the above beam-diameter-adjusting prisms 151, 152 or be provided with the bandwidth-compensating prism 155 as one or a plurality of the beam-diameter-adjusting prisms 151, 152. According to the example illustrated in FIG. 4, the bandwidth-compensating prism 155 is a right-triangle prism of an apex angle $\gamma$.

The bandwidth-compensating prism 155 is designed using simulation to have an optimal apex angle $\gamma$ and is disposed so an incidence angle $\theta$ of the input light relative to the bandwidth-compensating prism 155 and the incidence angle $\alpha$ relative to the transmissive diffraction grating 130, which is dependent on the incidence angle $\theta$, are optimal angles for a wavelength range $\lambda_S$ to $\lambda_L$ to be filtered.

The wavelength range $\lambda_S$ to $\lambda_L$ to be filtered corresponds to a wavelength range from a shortest wavelength $\lambda_S$ to a longest wavelength $\lambda_L$ of the passband center wavelength $\lambda_C$ that changes due to angle adjustment of the reflective surface 121 of the variable-angle mirror 120. A middle wavelength $\lambda_M$ described below signifies a middle wavelength $\lambda_M = (\lambda_S + \lambda_L)/2$ between the shortest wavelength $\lambda_S$ and the longest wavelength $\lambda_L$.

The simulation searches for an apex angle $\gamma$ and a disposition of the bandwidth-compensating prism 155 whereat, for cos $\alpha_S/W_S$, an inverse of the projection beam width when the shortest wavelength $\lambda_S$ is set as the passband center wavelength $\lambda_C$ by angle adjustment of the reflective surface 121 of the variable-angle mirror 120; cos $\alpha_M/W_M$, an inverse of the projection beam width when the middle wavelength $\lambda_M$ is set as the passband center wavelength $\lambda_C$; and cos $\alpha_L/W_L$, an inverse of the projection beam width when the longest wavelength $\lambda_L$ is set as the passband center wavelength $\lambda_C$, a sum of squares $\Sigma$ of differences between these inverses at the wavelengths $\lambda_S$, $\lambda_M$, and $\lambda_L$ is the smallest. The sum of squares $\Sigma$ is represented by the following formula.

$$\Sigma = \left(\frac{\cos\alpha_M}{W_M} - \frac{\cos\alpha_L}{W_L}\right)^2 + \left(\frac{\cos\alpha_M}{W_M} - \frac{\cos\alpha_S}{W_S}\right)^2 + \left(\frac{\cos\alpha_S}{W_S} - \frac{\cos\alpha_L}{W_L}\right)^2 \quad \text{[Math. 2]}$$

The search can be realized by using the simulation to calculate the corresponding sum of squares $\Sigma$ for all apex angles $\gamma$ and dispositions that can be realized. According to a simple simulation, the search can be performed upon fixing design parameters other than the apex angle $\gamma$ and disposition of the bandwidth-compensating prism 155 and the disposition of the fixed-angle mirror 140 in the tunable filter 100.

When the bandwidth-compensating prism 155 is designed and disposed according to the searched-for apex angle $\gamma$ and disposition, the disposition of the fixed-angle mirror 140 can be determined so the fixed-angle mirror 140 is disposed in a position wherethrough a first-order transmitted diffracted light of the wavelength range $\lambda_S$ to $\lambda_L$ passes.

By disposing the bandwidth-compensating prism 155, of the apex angle γ searched for in this manner that minimizes the sum of squares Σ, in the corresponding orientation, the differences between the inverses of the projection beam width W/cos α at the wavelengths $\lambda_S$, $\lambda_M$, and $\lambda_L$ are suppressed. As illustrated by the bold solid line in FIG. 5, this can suppress fluctuation of the bandwidth BW relative to the passband center wavelength $\lambda_C$.

Figure 5:
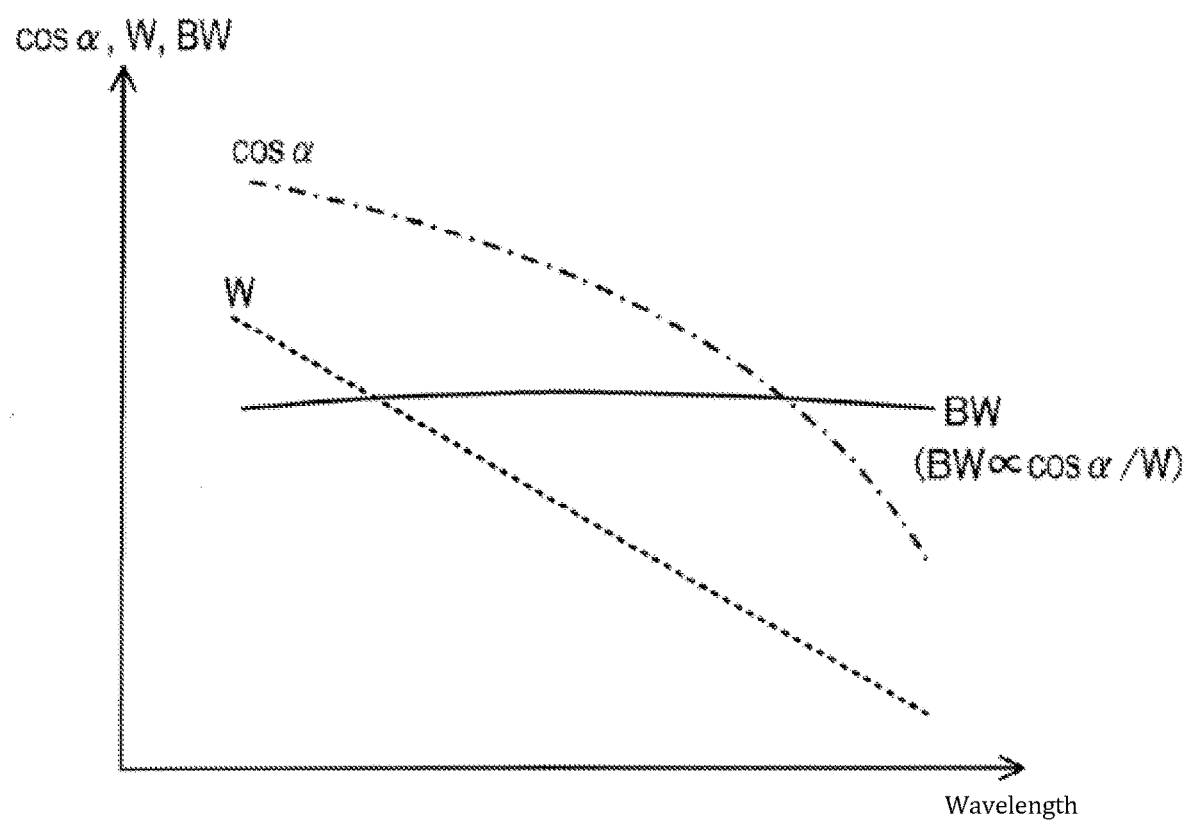
FIG. 5 A graph for describing wavelength dependency of a bandwidth.

The graph illustrated in FIG. 5 uses the bold solid line to illustrate changes in the bandwidth BW relative to the passband center wavelength $\lambda_C$ in the tunable filter 100 having the appropriately designed and disposed bandwidth-compensating prism 155. The dotted line in FIG. 5 illustrates changes in the beam diameter W relative to the wavelength $\lambda_C$, and the dot-dash line therein illustrates changes in the incidence angle α (specifically, cos α) relative to the wavelength $\lambda_C$.

The table in FIG. 6 shows, in the lowest row, examples of the bandwidth BW (GHz) at each wavelength $\lambda_C$ when the passband center wavelength $\lambda_C$ is set to 1,527 nm, 1,549 nm, and 1,570 nm, the bandwidths BW (GHz) being from when the bandwidth-compensating prism 155 is appropriately designed and disposed. In the table, θ indicates the incidence angle relative to the bandwidth-compensating prism 155 (see FIG. 4). The numerical values shown in the table indicate test results from when a prism of a refractive index n=1.5 constituted of a BK7 material is used as the bandwidth-compensating prism 155.

The table also shows, in the middle row, examples of the bandwidth BW (GHz) when the bandwidth-compensating prism 155 is not provided, as comparative examples. The table represents values of the inverse cos α/W of the projection beam width corresponding to the bandwidths BW by normalizing the values at the wavelength $\lambda_C$=1,549 nm to 1. As understood from the table, the wavelength dependency of the bandwidth BW is reduced by appropriately designing and disposing the bandwidth-compensating prism 155 according to the above search.

In this manner, according to the first variation, a tunable filter 100 wherein the wavelength dependency of the bandwidth BW is suppressed can be configured by using an appropriately designed bandwidth-compensating prism 155.

<Second Variation>

The tunable filter 100 of a second variation described below is a tunable filter wherein a majority of its configuration is identical to the tunable filter 100 of the main embodiments above. Therefore, in the following, differences between the tunable filter 100 of the second variation and the main embodiments above are selectively described, and other description is omitted as appropriate.

The tunable filter 100 of the second variation is designed to suppress reflected diffracted light arising at the transmissive diffraction grating 130 from going back up the propagation path of the input light to return upstream from the input optical fibers 111.

One performance indicator of the tunable filter 100 is return loss. The tunable filter 100 is, for example, used after an optical amplifier. In this situation, the tunable filter 100 is useful in removing optical noise added by the optical amplifier—that is, ASE noise—to improve an optical S/N ratio. However, when there is a light component that returns from the tunable filter 100, there is a possibility of oscillation arising in the optical amplifier and making the optical signal unstable. Therefore, it is significant to improve a return loss of the tunable filter 100.

Figure 7:
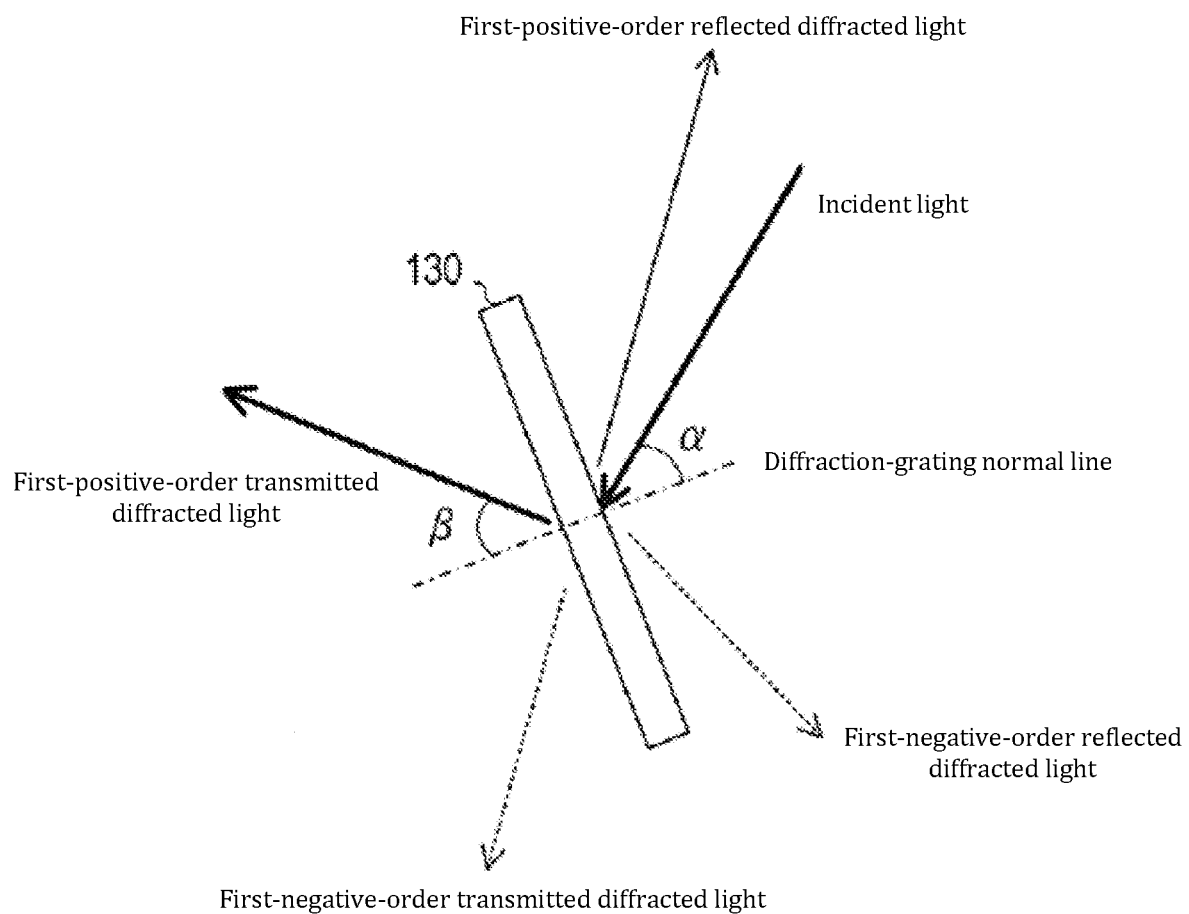
FIG. 7 A diagram for describing transmitted diffracted light and reflected diffracted light arising due to the transmissive diffraction grating.

As illustrated in FIG. 7, at the transmissive diffraction grating 130, transmitted diffracted light and reflected diffracted light are generated as the diffracted light corresponding to the incident light. That among these, the first-positive-order transmitted diffracted light is used as the output of the tunable filter 100 is as described in the main embodiments above.

Meanwhile, the reflected diffracted light may be reflected at the same angle as the incident light, and this reflected diffracted light becomes a factor in degrading the return loss of the tunable filter 100. For example, when the transmissive diffraction grating 130 is designed to be polarization independent, the incidence angle α is set to about 45 degrees.

When the incidence angle α and the diffraction angle β coincide, the reflected diffracted light is propagated so as to go back up the propagation path of the incident light, which is from the fiber collimator 110 to incidence on the transmissive diffraction grating 130 via the variable-angle mirror 120, and returns upstream through the input optical fibers 111.

As above, the relationship between the incidence angle α, the diffraction angle β, and the wavelength λ follows the grating equation sin α+sin β=Nmλ. When the wavelength λ and the incidence angle α satisfy the relational expression 2×sin α=Nmλ corresponding to the grating equation when α=β, an mth-order reflected diffracted light is reflected at the same angle as the incidence angle α, inviting return-loss degradation.

Therefore, return-loss degradation can be suppressed by designing the tunable filter 100 so an entirety of the wavelength range of the light incident on the transmissive diffraction grating 130 satisfies the formula 2×sin α≠Nmλ.

The incidence angle α is established according to the passband center wavelength $\lambda_C$ and is a function α(λ) of the wavelength λ. Therefore, in the second variation, the disposition of the optical system—including the positions and orientations of the variable-angle mirror 120, the transmissive diffraction grating 130, and the fixed-angle mirror 140—is designed and the tunable filter 100 is configured so the relational expression 2×sin α(λ)≠Nmλ is satisfied for the entire wavelength range $\lambda_S$ to $\lambda_L$ (that is, $\lambda_S \leq \lambda \leq \lambda_L$) of the input light to be filtered.

The controller 10 can cause the tunable filter 100 to function as a narrow-linewidth filter that varies in the wavelength range $\lambda_S$ to $\lambda_L$ and has favorable return loss by adjusting the angle of the reflective surface 121 of the variable-angle mirror 120 in the tunable filter 100 so the relational expression 2×sin α(λ)≠Nmλ is satisfied for the wavelength range $\lambda_S$ to $\lambda_L$.

<Miscellaneous>

Embodiments of the present disclosure, including variations, are described above. However, the present disclosure is not limited to the above embodiments and can adopt various aspects. For example, a prism for adjusting the beam diameter may be provided between the transmissive diffraction grating 130 and the fixed-angle mirror 140. The technical idea of the second variation may be applied to the first variation.

A function had by one component in the above embodiments may be provided dispersed among a plurality of components. A function had by a plurality of components may be integrated into one component. A portion of the configuration of the above embodiments may be omitted. At least one portion of the configuration of the above embodiments may be added to another configuration of the above embodiments or be substituted. The embodiments of the present disclosure include all aspects included in the technical idea defined from the wording given in the scope of patent claims.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF REFERENCE SIGNS

10 . . . controller; 100 . . . tunable filter; 110 . . . fiber collimator; 111 . . . input optical fibers; 112 . . . output optical fibers; 120 . . . variable-angle mirror; 121 . . . reflective surface; 130 . . . transmissive diffraction grating; 140 . . . fixed-angle mirror; 141 . . . reflective surface; 151, 152 . . . beam-diameter-adjusting prism; 155 . . . bandwidth-compensating prism; 160 . . . half-wave plate.

What is claimed is:

1. A tunable filter, comprising:
   an optical input/output unit;
   a first mirror having a first reflective surface disposed to reflect input light from the optical input/output unit;
   a transmissive diffraction grating disposed on a propagation path of the input light reflected by the first mirror;
   a second mirror having a second reflective surface disposed to reflect transmitted diffracted light from the transmissive diffraction grating corresponding to the input light, and
   an optical element disposed between the first mirror and the transmissive diffraction grating, that suppresses wavelength dependency of a full width at half maximum of the tunable filter and has an apex angle optimized by simulation,
   wherein
   the first reflective surface is a variable-angle reflective surface,
   the second reflective surface has a fixed orientation relative to the transmissive diffraction grating,
   the angle of the first reflective surface determines an incidence angle of the input light reflected by the first mirror on to the transmissive diffraction grating,
   the incidence angle determines light of a defined wavelength band, among the transmitted diffracted light, that is reflected at the second reflective surface so as to be propagated down a regular path, and
   the light of the defined wavelength band reflected at the second reflective surface is propagated on a path heading toward the optical input/output unit as the regular path and output from the optical input/output unit.

2. The tunable filter according to claim 1, wherein
   the light of the defined wavelength band reflected at the second reflective surface is propagated down a return path, which is from the second reflective surface to the optical input/output unit via the transmissive diffraction grating and the first mirror and corresponds to an outward path of the light of the defined wavelength band included in the input light from the optical input/output unit to the second reflective surface, as the regular path and output from the optical input/output unit.

3. The tunable filter according to claim 2, further comprising:
   a half-wave plate, disposed between the transmissive diffraction grating and the second mirror, with an optical axis tilted 45 degrees relative to a grating axis of the transmissive diffraction grating.

4. The tunable filter according to claim 1, further comprising:
   an optical component that enlarges a beam diameter of the light incident on the transmissive diffraction grating.

5. The tunable filter according to claim 4, wherein
   the optical component is disposed between the first mirror and the transmissive diffraction grating to enlarge the beam diameter of the input light propagated from the first mirror to the transmissive diffraction grating.

6. The tunable filter according to claim 1, wherein
   the optical element is configured to, for light of each wavelength band to be filtered corresponding to the input light, reduce differences between inverses, of an incidence-direction beam width of a projection surface of the light of each wavelength band projected onto the transmissive diffraction grating, at each wavelength band.

7. The tunable filter according to claim 6, wherein
   the optical element is constituted by no less than one prism designed and disposed to reduce the differences between the inverses at each wavelength band.

8. The tunable filter according to claim 1, wherein
   the transmissive diffraction grating is constituted by a substantially polarization-independent diffraction grating.

9. The tunable filter according to claim 1, wherein
   the first mirror is a MEMS mirror.

10. The tunable filter according to claim 1, wherein
    the tunable filter is designed so an incidence angle $\alpha$ of light of a wavelength $\lambda$ incident on the transmissive diffraction grating satisfies the following relational expression:

$$2 \sin \alpha \neq Nm\lambda,$$

where N is an inverse of a diffraction-grating period and m is a diffraction order, for an entirety of a wavelength range $\lambda 1 \leq \lambda \leq \lambda 2$, from a shortest wavelength $\lambda = \lambda 1$ to a longest wavelength $\lambda = \lambda 2$, of the light that, as the input light, becomes incident on the transmissive diffraction grating from the optical input/output unit via the first mirror.

* * * * *